Feb. 17, 1925.
F. W. KING
GOGGLES
Filed March 10, 1923
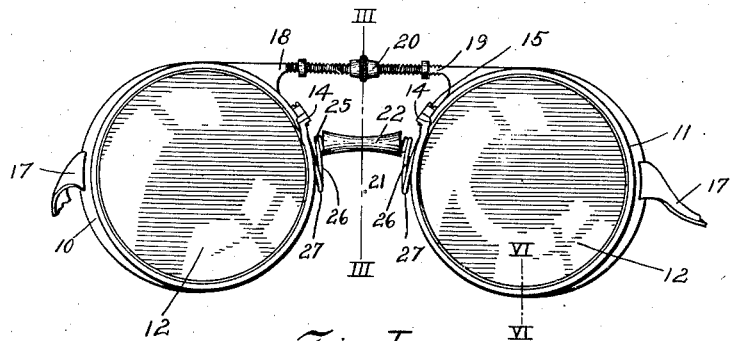
Fig. I
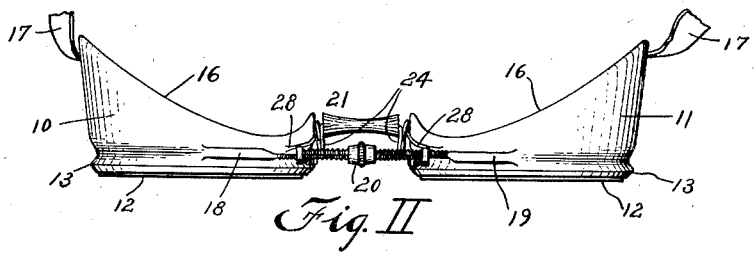
Fig. II
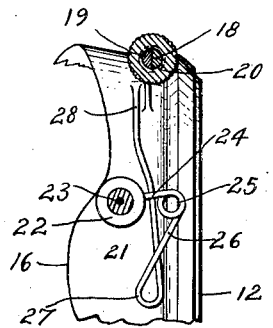
Fig. III
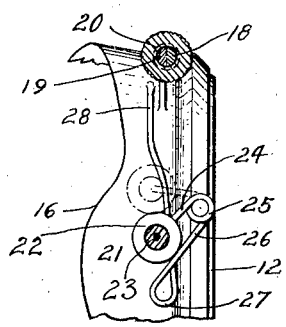
Fig. IV
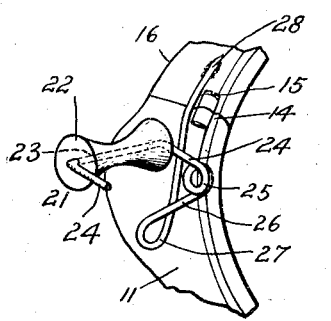
Fig. V
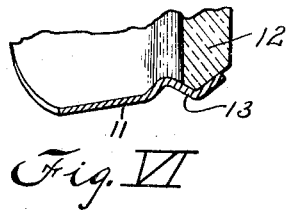
Fig. VI
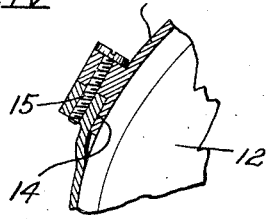
Fig. VII
INVENTOR
F. W. KING
BY
Harry H. Styll.
ATTORNEY Patented Feb. 17, 1925.

1,526,793

UNITED STATES PATENT OFFICE.

FREDERICK W. KING, OF NEW YORK, N. Y., ASSIGNOR TO AMERICAN OPTICAL COMPANY, OF SOUTHBRIDGE, MASSACHUSETTS, A VOLUNTARY ASSOCIATION OF MASSACHUSETTS.

GOGGLES.

Application filed March 10, 1923. Serial No. 624,098.

*To all whom it may concern:*

Be it known that I, FREDERICK W. KING, a citizen of the United States, residing at New York, in the county of New York and State of New York, have invented certain new and useful Improvements in Goggles, of which the following is a specification.

This invention relates to improvements in eye protectors, and relates especially to that type known as industrial goggles, used for the protection of workmen's eyes from dust, heat, etc.

One object of the present invention is to provide an eye protector in which the distance between the center of the lenses may be increased or decreased without changing the relation of their axes to the horizontal.

Another object is to provide an eye protector in which the position of the nose engaging portion of the bridge may be varied vertically, up or down, or horizontally, in or out, in order to readily fit the facial characteristics of the wearer.

Another object is to provide a safety protection goggle from which the lenses will be readily removable for replacement purposes.

Other objects and advantages will be apparent from the following description taken in connection with the accompanying drawings forming a part of this specification.

In the drawings, wherein similar reference characters designate corresponding parts throughout the several views, Figure I is a front elevation of an eye protector embodying the invention.

Figure II is a top plan view.

Figure III is a vertical transverse section on the line III—III of Figure I.

Figure IV is a similar view showing the adjustment of the bridge member.

Figure V is a detail perspective view of the bridge connection.

Figure VI is a section on line VI—VI of Figure I.

Figure VII is a fragmentary vertical longitudinal sectional view through the eye cup, showing the overlapping ends and fastening means.

My improved eye protector comprises eye cups 10 and 11, each provided with a lens 12 seated within the groove 13 of the eye cups, as best shown in Figures I, V and VII. The eye cups are made of sheet metal rather than seamless tubing, and the ends of the material overlap, as at 14. A screw 15 secures the two ends together and holds the lens in place. The rear edge of the cups may preferably be formed in an irregular curve as at 16 to conform to the shape of the wearer's face, and if desirable it may be suitably padded to protect the face from injury. Elastic bands 17 or other means, such as a pair of temples, may be provided for attaching the device to the head of the wearer.

Secured to the top of the eye cup 10 is a bar 18, which is semi-circular in cross section, and extends horizontally towards the other eye cup. A similar bar 19 is secured to the eye cup 11. These two bars 18 and 19 overlap one another with their flat sides contacting. Thus when the two bars are assembled they form a member which is circular in cross section. One bar is provided with a right hand thread and the other with a left hand thread of the same pitch. A thumb nut 20 internally threaded in both directions is assembled as shown so that rotation of the nut 20 cooperating with the oppositely threaded bars 18 and 19 will move the eye cups either towards or away from the vertical center, thereby decreasing or increasing the distance between the centers of the lenses 12.

An adjustable bridge member is generally designated by the numeral 21. It comprises a hollow substantially cylindrical nose engaging member 22, and if desirable its surface may be uniformly curved as shown. A wire 23 passes through the nose engaging member 22 and has its ends offset as at 24, bent into a loop at 25, a second offset 26 bent upon itself as at 27, and the extreme ends secured to the outer side of the eye cups, as at 28. The arrangement of this wire 23 is such that it will yield readily to variations in the distance between the lenses without affecting the relation of their axes to the horizontal. Furthermore, the loops 25 and offset 26 permit adjustment of the nose engaging member 22, either in and out or up and down, in order to conform to the facial characteristics of the wearer.

From this description it will be seen that I have constructed an eye protector which may be horizontally adjusted to fit different people, and which will maintain the desired adjustment. If necessary the wearer may use vision correcting lenses and the arrangement is such that replacements can be made very easily.

It is, of course, to be understood that I reserve the right to make changes in the form, proportions and arrangement of parts within the scope of the claims without departing from the spirit of the invention.

Having thus described my invention, what I claim is:

1. In a device of the character described, a pair of lens holding members and an elongated bendable member connecting the lens holding members, and comprising on each side a descending portion from the point of attachment to the lens holding member, a loop portion, an ascending portion from the loop, a complete coil at the end of the ascending portion, a rearwardly extending portion from the coil, and a portion extending at right angles from the rearwardly extending portion in the direction of the other side.

2. In a device of the character described, a pair of lens holding members and an elongated bendable member connecting the lens holding members, and comprising on each side a descending portion from the point of attachment to the lens holding member, a loop portion, an ascending portion from the loop, a complete coil at the end of the ascending portion, a rearwardly extending portion from the coil, a portion extending at right angles from the rearwardly extending portion in the direction of the other side, a second member uniting the lens holding members, and means for shortening or lengthening the same to regulate the distance between the lens holding members.

3. In a device of the character described, a pair of lens holding members and an elongated bendable member connecting the lens holding members, and comprising on each side a descending portion from the point of attachment to the lens holding member, a loop portion, an ascending portion from the loop, a complete coil at the end of the ascending portion, a rearwardly extending portion from the coil, a portion extending at right angles from the rearwardly extending portion in the direction of the other side, a second member connecting the lens holding members, and screw means for shortening or lengthening the same to regulate the distance between the lens holding means.

4. In a device of the character described, a pair of lens holding members, a spool shaped bridge member between the lens holding members and an elongated bendable member connecting the lens holding members passing through the spool member and comprising on each end of the spool a descending portion from the point of attachment to the lens holding member, a loop, an ascending portion from the loop, a complete coil at the end of the ascending portion, and a portion extending from the coil to the spool member.

5. In a device of the character described, a pair of lens holding members, a spool shaped bridge member between the lens holding members, an elongated bendable member connecting the lens holding members, passing through the spool member and comprising on each end of the spool a descending portion from the point of attachment to the lens holding member, a loop, an ascending portion from the loop, a complete coil at the end of the ascending portion, a portion extending from the coil to the spool member, a second member connecting the lens holding members, and means for lengthening or shortening said member to regulate the distance between the lens holding members.

FREDERICK W. KING.